(12) United States Patent
Khanna et al.

(10) Patent No.: US 10,712,963 B2
(45) Date of Patent: Jul. 14, 2020

(54) TECHNOLOGIES FOR SECURE ENCRYPTED EXTERNAL MEMORY FOR FIELD-PROGRAMMABLE GATE ARRAYS (FPGAS)

(71) Applicant: Intel Corporation, Santa Clara, CA (US)

(72) Inventors: Rahul Khanna, Portland, OR (US); Susanne M. Balle, Hudson, NH (US); Francesc Guim Bernat, Barcelona (ES); Sujoy Sen, Portland, OR (US); Paul Dormitzer, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 15/721,814

(22) Filed: Sep. 30, 2017

(65) Prior Publication Data
US 2018/0150644 A1 May 31, 2018

Related U.S. Application Data

(60) Provisional application No. 62/427,268, filed on Nov. 29, 2016.

(30) Foreign Application Priority Data

Aug. 30, 2017 (IN) .............................. 201741030632

(51) Int. Cl.
*G06F 3/06* (2006.01)
*G06F 16/174* (2019.01)
(Continued)

(52) U.S. Cl.
CPC .......... *G06F 3/0641* (2013.01); *G06F 3/0604* (2013.01); *G06F 3/065* (2013.01);
(Continued)

(58) Field of Classification Search
CPC ........ G06F 3/065; G06F 3/067; G06F 3/0617; G06F 3/0611; G06F 3/0653;
(Continued)

(56) References Cited

U.S. PATENT DOCUMENTS 10,061,731 B1 * 8/2018 Kawai ................... G06F 13/387
10,331,533 B2 * 6/2019 Munday .............. G06F 11/3037
(Continued)

*Primary Examiner* — Kambiz Zand
*Assistant Examiner* — Benjamin A Kaplan
(74) *Attorney, Agent, or Firm* — Barnes & Thornburg LLP

(57) ABSTRACT

Technologies for encrypted data access by field-programmable gate array (FPGA) user kernels include a computing device having an FPGA and an external memory device accessible by the FPGA. The FPGA includes a secure key store, a micro-encryption engine, and multiple slots for user kernels that are each identifiable with an index. A user kernel is programmed at an index and a symmetric encryption key is provisioned to the secure key store at the index. The micro encryption engine may read encrypted data from the external memory device, decrypt the encrypted data with the key associated with the index of the user kernel, and forward plain text data to the user kernel. The micro encryption engine may also receive plain text data from the user kernel, encrypt the plain text data with the key, and write the encrypted data to the external memory device. Other embodiments are described and claimed.

28 Claims, 13 Drawing Sheets

(51) Int. Cl.

| | | |
|---|---|---|
| G06F 21/57 | (2013.01) | |
| G06F 21/73 | (2013.01) | |
| G06F 8/65 | (2018.01) | |
| H04L 12/24 | (2006.01) | |
| H04L 29/08 | (2006.01) | |
| G06F 11/30 | (2006.01) | |
| G06F 9/50 | (2006.01) | |
| H03M 7/30 | (2006.01) | |
| H03M 7/40 | (2006.01) | |
| H04L 12/26 | (2006.01) | |
| H04L 12/813 | (2013.01) | |
| H04L 12/851 | (2013.01) | |
| G06F 11/07 | (2006.01) | |
| G06F 11/34 | (2006.01) | |
| G06F 7/06 | (2006.01) | |
| G06T 9/00 | (2006.01) | |
| H03M 7/42 | (2006.01) | |
| H04L 12/28 | (2006.01) | |
| H01R 13/631 | (2006.01) | |
| H05K 7/14 | (2006.01) | |
| H04L 12/911 | (2013.01) | |
| G06F 11/14 | (2006.01) | |
| H04L 12/46 | (2006.01) | |
| H04L 29/12 | (2006.01) | |
| G06F 13/16 | (2006.01) | |
| G06F 21/62 | (2013.01) | |
| G06F 21/76 | (2013.01) | |
| H03K 19/173 | (2006.01) | |
| H04L 9/08 | (2006.01) | |
| H04L 12/933 | (2013.01) | |
| G06F 9/38 | (2018.01) | |
| G06F 9/48 | (2006.01) | |
| G06F 12/02 | (2006.01) | |
| G06F 12/06 | (2006.01) | |
| G06T 1/20 | (2006.01) | |
| G06T 1/60 | (2006.01) | |
| G06F 9/54 | (2006.01) | |
| G06F 8/656 | (2018.01) | |
| G06F 8/658 | (2018.01) | |
| G06F 8/654 | (2018.01) | |
| G06F 9/4401 | (2018.01) | |
| H01R 13/453 | (2006.01) | |
| H04L 29/06 | (2006.01) | |
| G06F 15/80 | (2006.01) | |

(52) U.S. Cl.
CPC ............ *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/4881* (2013.01); *G06F 9/505* (2013.01); *G06F 9/5005* (2013.01); *G06F 9/5038* (2013.01); *G06F 9/544* (2013.01); *G06F 11/079* (2013.01); *G06F 11/0709* (2013.01); *G06F 11/0751* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/2007* (2013.01); *H04L 67/10* (2013.01); *H04L 67/1014* (2013.01); *H04L 67/327* (2013.01); *H04L 67/36* (2013.01); *H05K 7/1452* (2013.01); *H05K 7/1487* (2013.01); *G06F 11/1453* (2013.01); *G06F 12/023* (2013.01); *G06F 15/80* (2013.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01)

(58) Field of Classification Search
CPC .... G06F 3/0647; G06F 3/0608; G06F 3/0641; G06F 3/0613; G06F 3/0604; G06F 8/656; G06F 8/658; G06F 8/654; G06F 8/65; G06F 9/5005; G06F 9/3891; G06F 9/5038; G06F 9/544; G06F 9/4401; G06F 9/505; G06F 9/4881; G06F 9/3851; G06F 7/06; G06F 11/0709; G06F 11/0751; G06F 11/3006; G06F 11/079; G06F 11/3409; G06F 11/3034; G06F 11/3055; G06F 11/1453; G06F 11/3079; G06F 15/80; G06F 16/1744; G06F 21/57; G06F 21/73; G06F 21/6218; G06F 21/76; G06F 12/023; G06F 12/0296; G06F 12/0284; G06F 2212/401; G06F 2212/402; G06F 2221/2107; H04L 41/0816; H04L 41/0853; H04L 41/12; H04L 41/044; H04L 41/046; H04L 41/0896; H04L 41/142; H04L 67/10; H04L 67/327; H04L 67/36; H04L 43/04; H04L 43/06; H04L 43/0894; H04L 43/08; H04L 47/20; H04L 47/2441; H04L 47/78; H04L 12/2881; H04L 12/4633; H04L 61/2007; H04L 9/0822; H04L 9/104; H04L 49/104; H04L 63/1425; H04L 67/1014; G06T 1/20; G06T 1/60; G06T 9/005; H03M 7/42; H03M 7/3084; H03M 7/40; H03M 7/60; H03M 7/6011; H03M 7/6017; H03M 7/6039; H01R 13/4538; H01R 13/631; H03K 19/1731; H05K 7/1452; H05K 7/1487

USPC ............................................................ 713/164
See application file for complete search history.

(56) References Cited

U.S. PATENT DOCUMENTS

| | | | |
|---|---|---|---|
| 10,541,984 B2* | 1/2020 | Cela | H04L 63/1441 |
| 2013/0051552 A1* | 2/2013 | Handschuh | G06F 21/602 |
| | | | 380/44 |
| 2018/0278583 A1* | 9/2018 | Cela | H04L 9/3242 |

* cited by examiner

US 10,712,963 B2

TECHNOLOGIES FOR SECURE ENCRYPTED EXTERNAL MEMORY FOR FIELD-PROGRAMMABLE GATE ARRAYS (FPGAS)

CROSS-REFERENCE TO RELATED APPLICATIONS

The present application claims the benefit of U.S. Provisional Patent Application No. 62/427,268, filed Nov. 29, 2016 and Indian Provisional Patent Application No. 201741030632, filed Aug. 30, 2017.

BACKGROUND

Modern computing devices may include general-purpose processor cores as well as a variety of hardware accelerators for performing specialized tasks. Certain computing devices may include one or more field-programmable gate arrays (FPGAs), which may include programmable digital logic resources that may be configured by the end user or system integrator.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
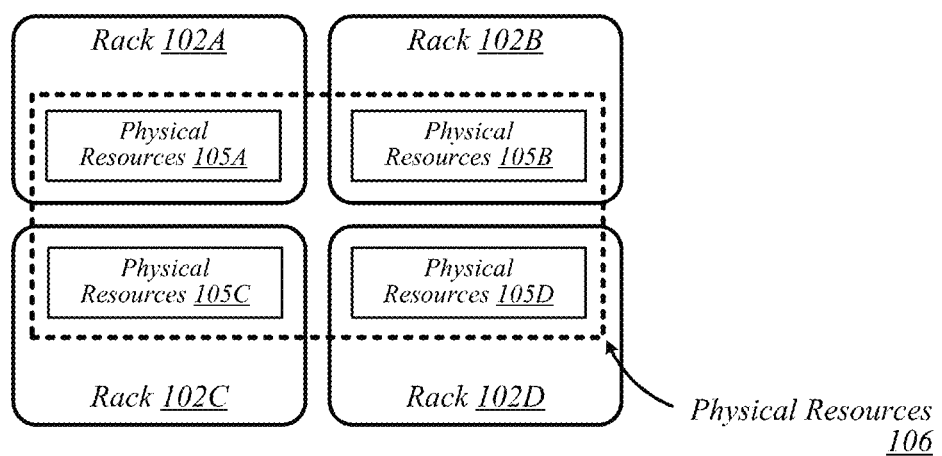
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual inline memory modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, application-specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
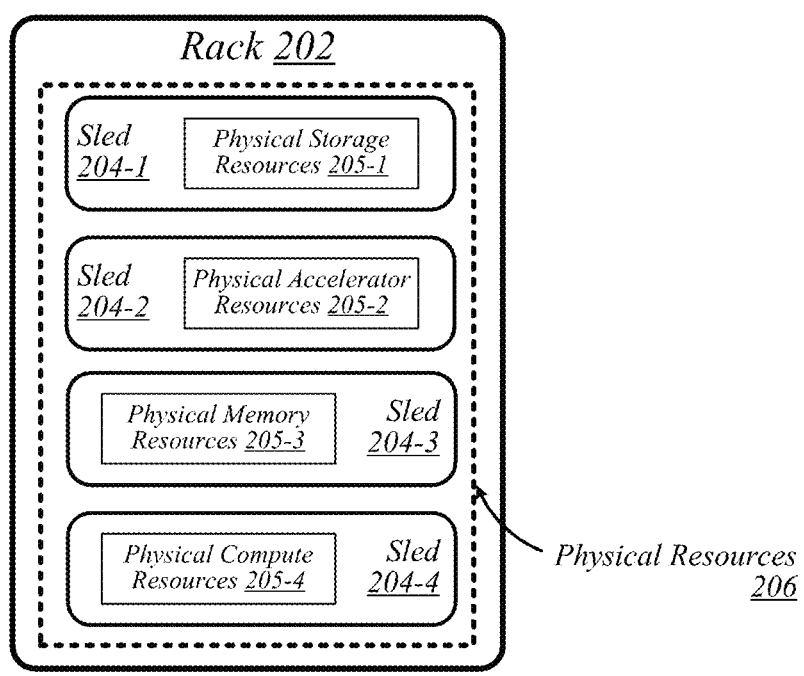
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
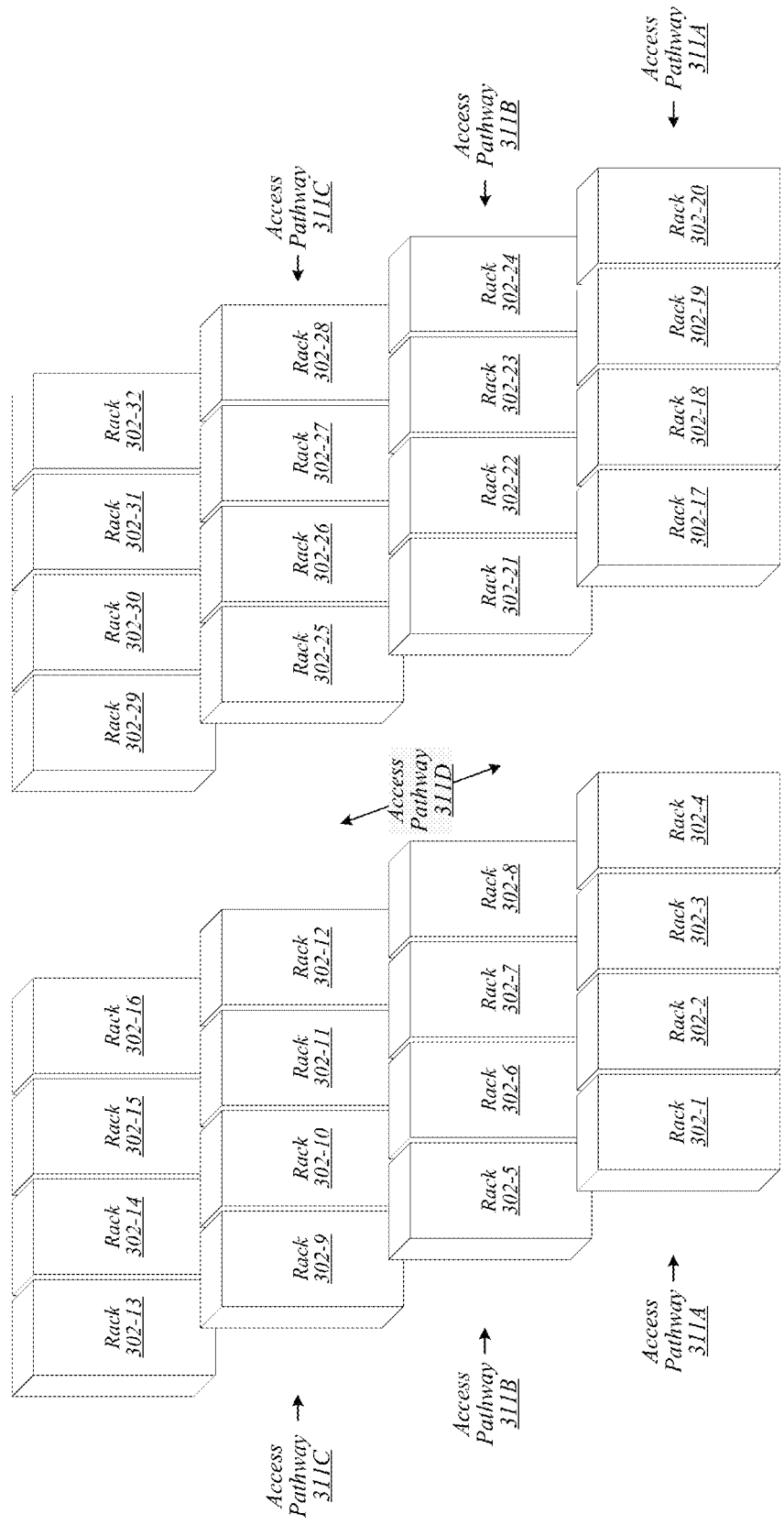
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
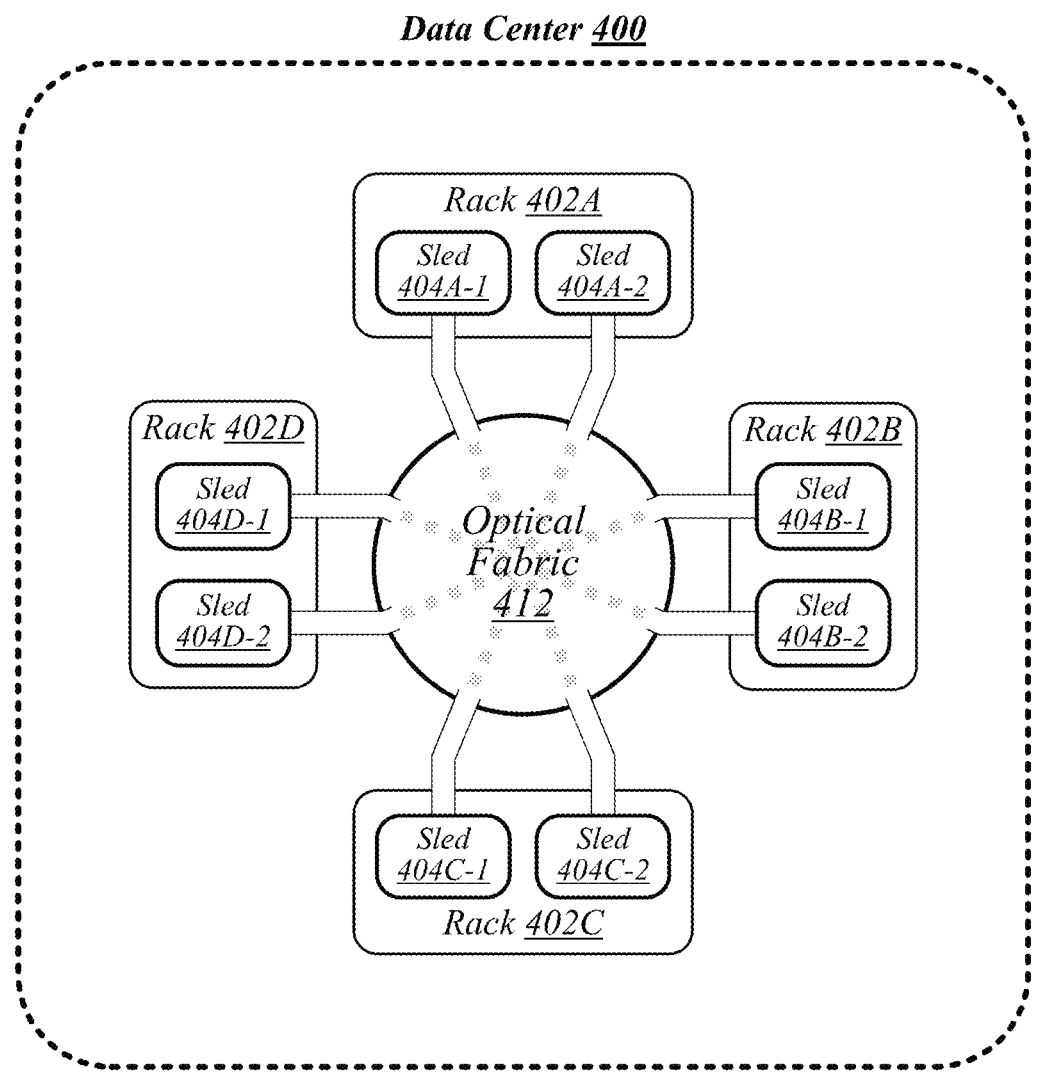
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
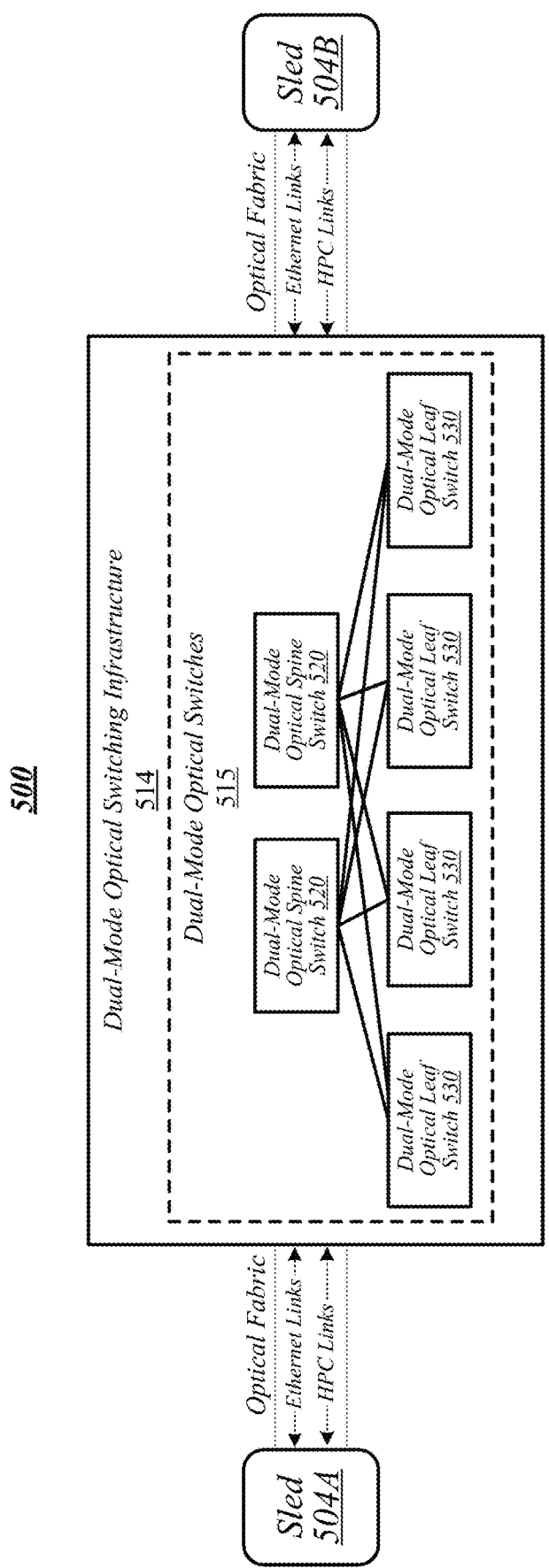
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
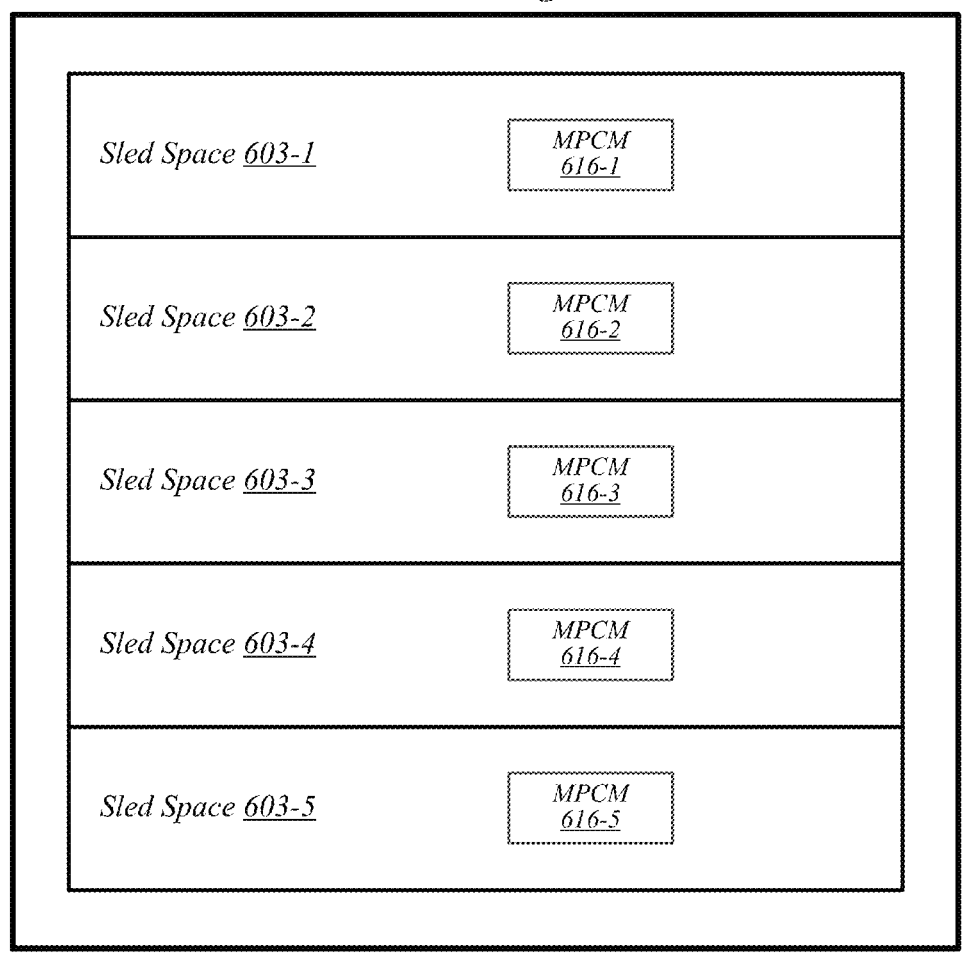
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
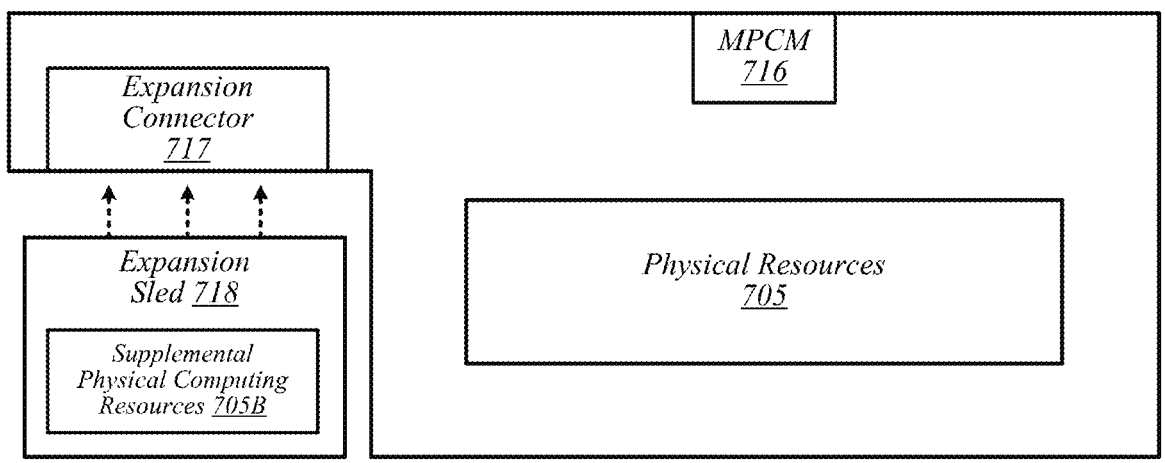
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
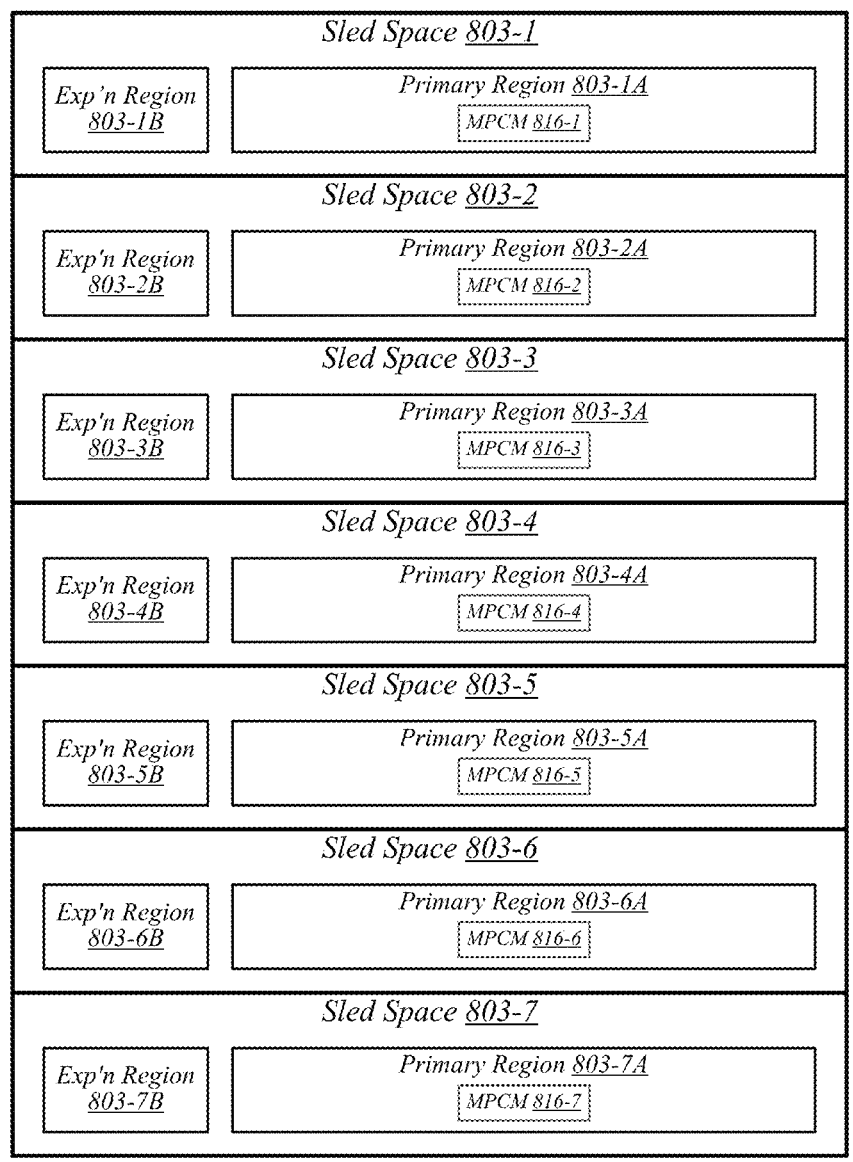
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
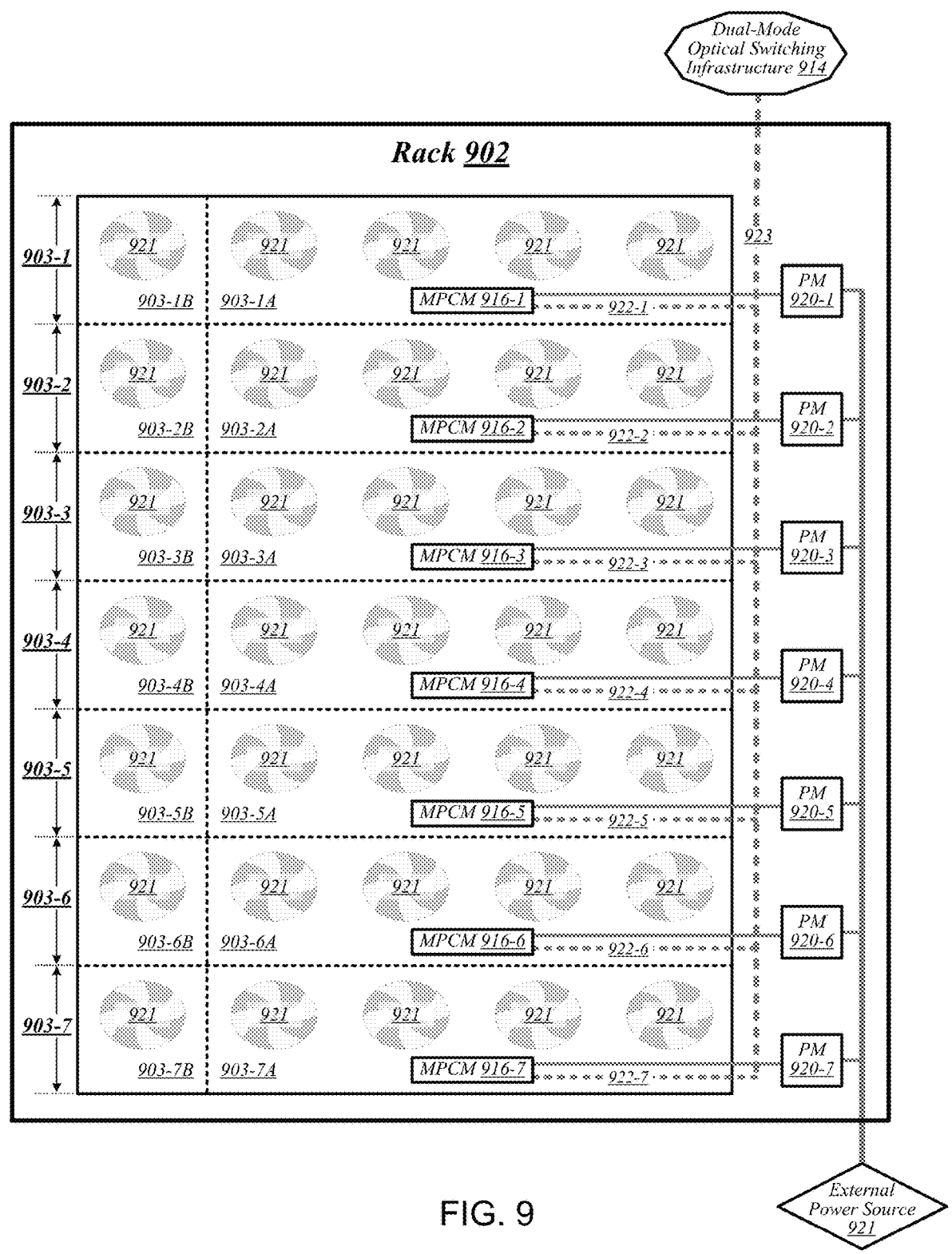
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
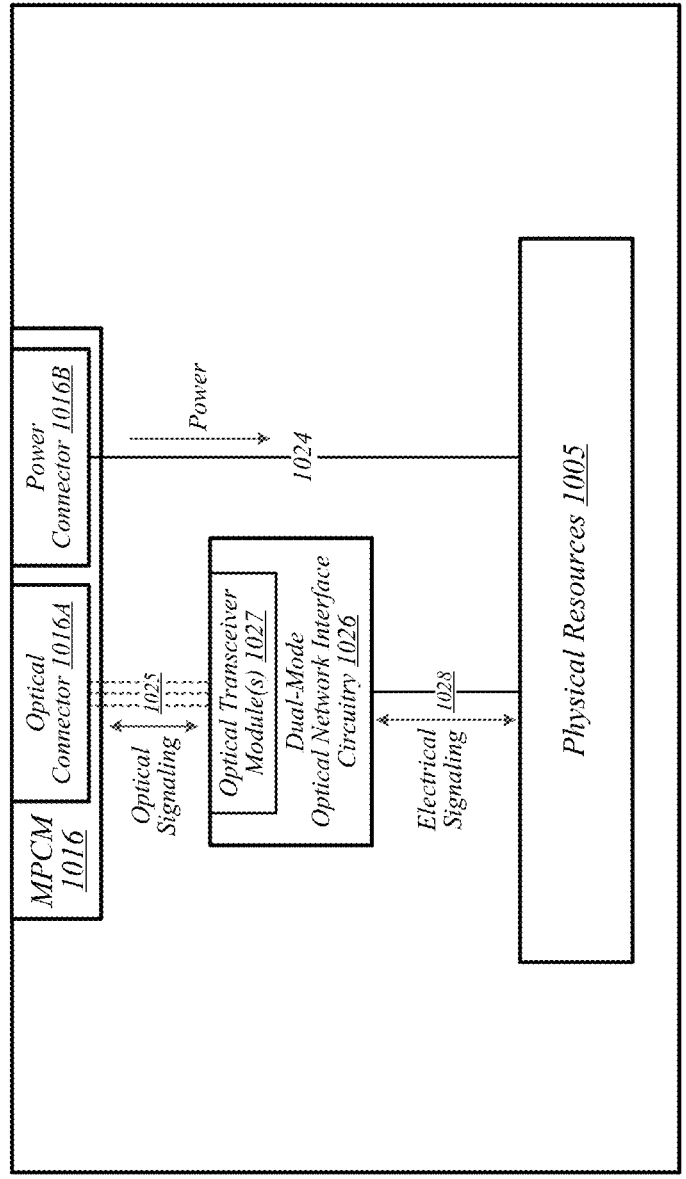
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
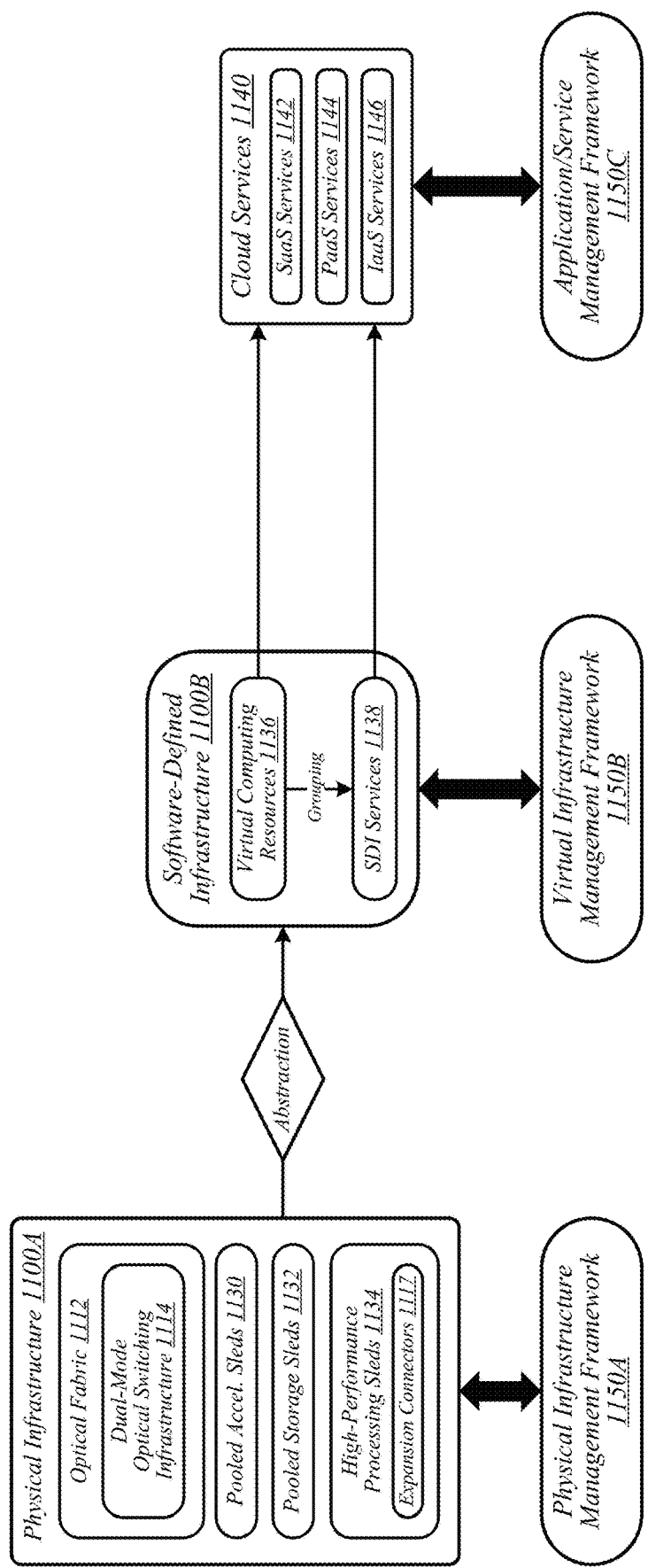
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
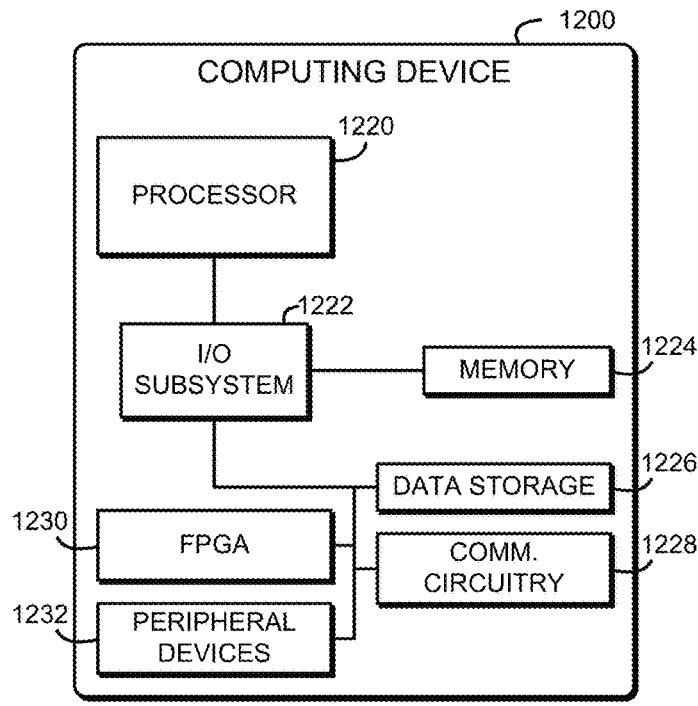
FIG. 12 is a simplified block diagram of at least one embodiment of a computing device for encrypted external memory for FPGAs.

Referring now to FIG. 12, an illustrative computing device 1200 for encrypted external memory for FPGAs includes a processor 1220, an input/output (I/O) subsystem 1222, a memory 1224, a data storage device 1226, and a field-programmable gate array (FPGA) 1230. The computing device 1200 may be embodied as server computer, a rack server, a blade server, a compute node, and/or a sled in a data center, such as a sled 204 as described above in connection with FIG. 2, a sled of the physical infrastructure 1100A as described above in connection with FIG. 11, or another sled of the data center.

In use, as described below, the computing device 1200 programs the FPGA 1230 with one or more user kernels or other programmed state machines. Each user kernel is identified by an index, which may be an integer or other identifier. The FPGA 1230 is securely provisioned with a symmetric encryption key associated with the index of each user kernel. When a user kernel accesses data stored in an external memory device such as the main memory 1224, a micro-encryption engine uses the symmetric encryption key associated with that user kernel to encrypt and/or decrypt the data stored in the external memory device. By encrypting the data stored in the external memory device and protecting the associated symmetric encryption keys, the computing device 1200 may prevent a user kernel from accessing the data of another user kernel, thus providing data security and isolation between multiple user kernels programmed in the same FPGA 1230. Accordingly, the computing device 1200 may improve data security with FPGAs 1230, particularly for multi-tenant computing devices 1200, such as devices in a data center.

The processor 1220 may be embodied as any type of processor capable of performing the functions described herein. For example, the processor 1220 may be embodied as a single or multi-core processor(s), digital signal processor, microcontroller, or other processor or processing/controlling circuit. Similarly, the memory 1224 may be embodied as any type of volatile or non-volatile memory or data storage capable of performing the functions described herein. In operation, the memory 1224 may store various data and software used during operation of the computing device 1200 such operating systems, applications, programs, libraries, and drivers. The memory 1224 is communicatively coupled to the processor 1220 via the I/O subsystem 1222, which may be embodied as circuitry and/or components to facilitate input/output operations with the processor 1220, the memory 1224, and other components of the computing device 1200. For example, the I/O subsystem 1222 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1222 may form a portion of a system-on-a-chip (SoC) and be incorporated, along with the processor 1220, the memory 1224, and other components of the computing device 1200, on a single integrated circuit chip.

The data storage device 1226 may be embodied as any type of device or devices configured for short-term or long-term storage of data such as, for example, memory devices and circuits, memory cards, hard disk drives, solid-state drives, non-volatile flash memory, or other data storage devices. The computing device 1200 may also include a communications subsystem 1228, which may be embodied as any communication circuit, device, or collection thereof, capable of enabling communications between the computing device 1200 and other remote devices over a computer network (not shown). The communications subsystem 1228 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

As shown in FIG. 12, the computing device 1200 includes a field-programmable gate array (FPGA) 1230. The FPGA 1230 may be embodied as an integrated circuit including programmable digital logic resources that may be configured after manufacture. The FPGA 1230 may include, for example, a configurable array of logic blocks in communication over a configurable data interchange. The FPGA 1230 may be coupled to the processor 1220 via a high-speed connection interface such as a peripheral bus (e.g., a PCI Express bus) or an inter-processor interconnect (e.g., an in-die interconnect (IDI) or QuickPath Interconnect (QPI)), via a fabric interconnect such as Intel® Omni-Path Architecture, or via any other appropriate interconnect. Additionally, although illustrated in FIG. 1 as a discrete component separate from the processor 1220 and/or the I/O subsystem 1222, it should be understood that in some embodiments the FPGA 1230, the processor 1220, the I/O subsystem 1222, and/or the memory 1224 may be incorporated in the same package and/or in the same computer chip, for example in the same SoC. In some embodiments, the FPGA 1230 may be incorporated as part of a network interface controller (NIC) of the computing device 1200 and/or included in the same multi-chip package as the NIC.

The computing device 1200 may further include one or more peripheral devices 1232. The peripheral devices 1232 may include any number of additional input/output devices, interface devices, hardware accelerators, and/or other peripheral devices. For example, in some embodiments, the peripheral devices 1232 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 13:
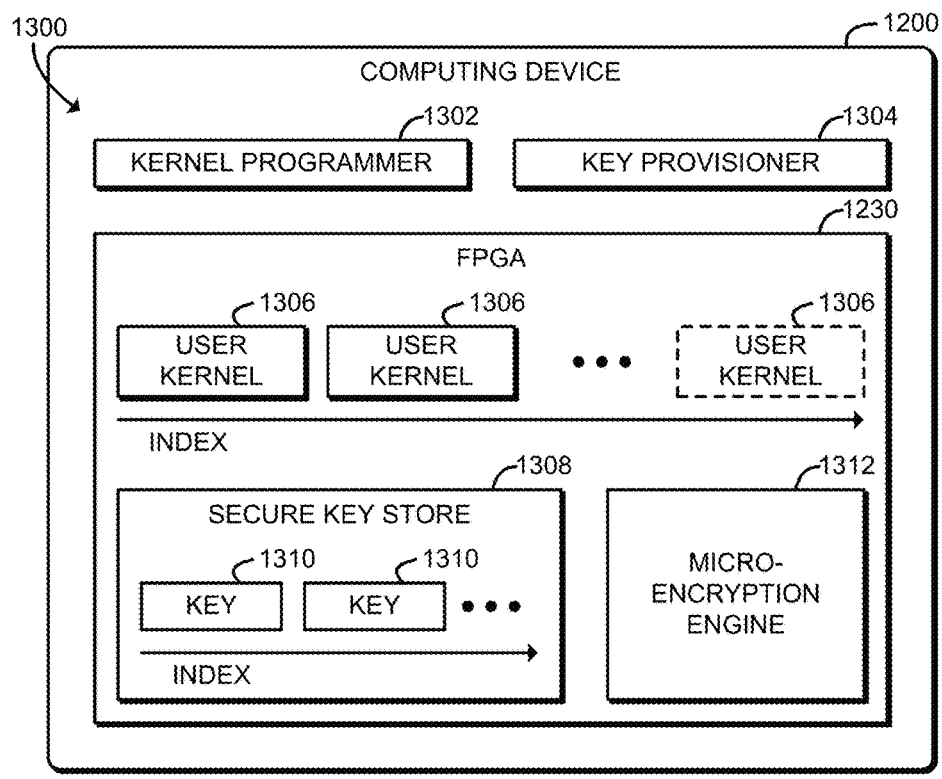
FIG. 13 is a simplified block diagram of at least one embodiment of an environment that may be established by the computing device of FIG. 12.

Referring now to FIG. 13, in an illustrative embodiment, the computing device 1200 establishes an environment 1300 during operation. The illustrative environment 1300 includes a kernel programmer 1302, a key provisioner 1304, and the FPGA 1230. The FPGA 1230 includes multiple user kernels 1306, a secure key store 1308, and a micro-encryption engine 1312. The various components of the environment 1300 may be embodied as hardware, firmware, software, or a combination thereof. As such, in some embodiments, one or more of the components of the environment 1300 may be embodied as circuitry or collection of electrical devices (e.g., kernel programmer circuitry 1302, key provisioner circuitry 1304, user kernel circuitry 1306, secure key store circuitry 1308, and/or micro-encryption engine circuitry 1312). It should be appreciated that, in such embodiments, one or more of the kernel programmer circuitry 1302, the key provisioner circuitry 1304, the user kernel circuitry 1306, the secure key store circuitry 1308, and/or the micro-encryption engine circuitry 1312 may form a portion of the processor 1220, the I/O subsystem 1222, the FPGA 1230, and/or other components of the computing device 1200. Additionally, in some embodiments, one or more of the illustrative components may form a portion of another component and/or one or more of the illustrative components may be independent of one another.

The kernel programmer 1302 is configured to program the FGPA 1230 with one or more user kernel 1306. Each user kernel 1306 may be embodied as a state machine or other user-programmed logic block of the FPGA 1230. The FPGA 1230 may include multiple slots or other reserved areas that may each be programmed with a user kernel 1306. As shown, each user kernel 1306 is identified by an index. The index may be embodied as an integer or other mapping of index to slot. The FPGA 1230 may execute each user kernel 1306 after being programmed.

The key provisioner 1304 is configured to securely provision the FPGA 1230 with a symmetric encryption key 1310 at an index corresponding to a user kernel 1306. The symmetric encryption key 1310 may be provisioned, for example, by performing a network key exchange with the FPGA 1230, performing a PCI express data transfer with the FPGA 1230, or otherwise securely exchanging data with the FPGA 1230.

The secure key store 1308 is configured to store multiple symmetric encryption keys 1310 that are each associated with an index of a user kernel 1306. When stored, the symmetric encryption keys 1310 are not accessible by the user kernels 1306 of the FPGA 1230. For example, the keys 1310 may be stored in write-only storage of the FPGA 1230. The secure key store 1308 may be further configured to return the index associated with a symmetric encryption key 1310 in response to provisioning the FGPA 1230 with that key 1310. The secure key store 1308 may be further configured to retrieve a symmetric encryption key 1310 associated with a particular index and to provide that symmetric encryption key 1310 to the micro-encryption engine 1312. The secure key store 1308 may be embodied as a programmed logic block of the FPGA 1230. In some embodiments, the secure key store 1308 may be a system block of the FPGA 1230 that is not accessible or otherwise configurable by a user of the FPGA 1230.

The micro-encryption engine 1312 is configured to access encrypted data in an external memory device coupled to the FPGA 1230, communicate plain text data with a user kernel 1306, and perform a cryptographic operation (e.g., encryption or decryption) using the symmetric encryption key 1310 associated with the user kernel 1306, the plain text data, and the encrypted data. The encrypted data is the plan text data encrypted with the symmetric encryption key 1310. To decrypt the encrypted data, the micro-encryption engine 1312 may read the encrypted data from the external memory device, decrypt the encrypted data with the symmetric encryption key 1310 to generate the plain text data, and forward the plain text data to the user kernel 1306. To encrypt the plain text data, the micro-encryption engine 1312 may receive the plain text data from the user kernel 1306, encrypt the plain text data with the symmetric encryption key 1310 to generate the encrypted data, and write the encrypted data to the external memory device. The micro-encryption engine 1312 may be further configured to write the index in the external memory device in response to encrypting the plain text data. The micro-encryption engine 1312 may be embodied as a programmed logic block of the FPGA 1230. In some embodiments, the micro-encryption engine 1312 may be a system block of the FPGA 1230 that is not accessible or otherwise configurable by a user of the FPGA 1230.

Figure 14:
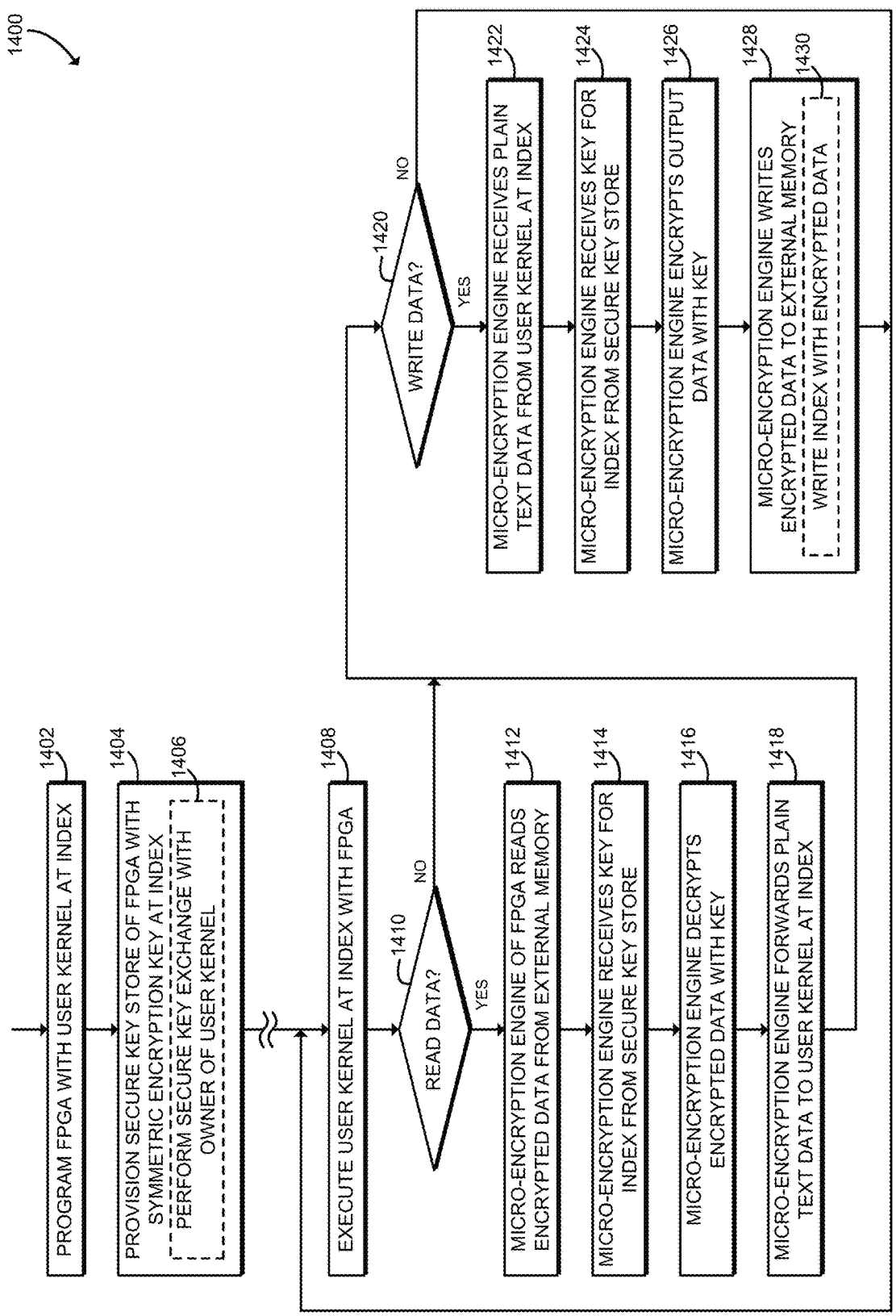
FIG. 14 is a simplified flow diagram of at least one embodiment of a method for accessing encrypted external memory that may be executed by the computing device of FIGS. 12-13.

Referring now to FIG. 14, in use, the computing device 1200 may execute a method 1400 for accessing encrypted external memory. It should be appreciated that, in some embodiments, the operations of the method 1400 may be performed by one or more components of the environment 1300 of the computing device 1200 as shown in FIG. 13. The method 1400 begins in block 1402, in which the computing device 1200 programs the FPGA 1230 with a user kernel 1306 at a particular index. Programming the FPGA 1230 loads the user kernel 1306 into a slot or other collection of hardware resources of the FPGA 1230 and allows the user kernel 1306 to be executed. The computing device 1200 may use any appropriate technique to program the FPGA 1230, for example by sending bitstream data or other hardware definition data to the FPGA 1230. As described above, the index may be embodied as an integer, identifier, or other mapping of index to slot in the FPGA 1230.

In block 1404, the computing device 1200 provisions the secure key store 1308 with a symmetric encryption key 1310 at the index of the user kernel 1306. After being provisioned in the secure key store 1308, the symmetric encryption key 1310 is not readable or otherwise accessible by the user kernels 1306, including the user kernel 1306 with the same associated index. For example, the secure key store 1308 may be embodied as or otherwise include a write-only memory of the FPGA 1230. As described further below, the symmetric encryption key 1310 may be used by parts of the FPGA 1230 other than the user kernels 1306 (e.g., the micro-encryption engine 1312) to encryption and/or decrypt data stored in an external memory device. The computing device 1200 may use any appropriate technique to provision the symmetric encryption key 1310 to the secure key store 1308. For example, in some embodiments the symmetric encryption key 1310 may be securely provisioned using a unique FPGA device key that is embedded into the FPGA 1230 at the time of manufacturing (e.g., a device private key or other unique key). The FPGA device may also be used to securely provision the user kernel 1306 to the FPGA 1230, for example by securely and privately transferring the bitstream for the user kernel 1306 to the FPGA 1230. In some embodiments, in block 1406 the computing device 1200 may perform a secure key exchange with the owner of the user kernel 1306. The secure key exchange may be performed, for example, over a network connection with the FGPA 1230, over a PCI express data connection or other local hardware connection with the FPGA 1230, or with another secure communication technique. Additionally, although illustrated as being programmed with a single user kernel 1306 and provisioned with a single symmetric encryption key 1310 for that user kernel 1306, it should be understood that the FPGA 1230 may programmed with multiple user kernels 1306 and provisioned with a symmetric encryption key 1310 associated with each user kernel 1306.

After programming the user kernel 1306 and provisioning the symmetric encryption key 1310, in block 1408 the computing device 1200 executes the user kernel 1306 using the FPGA 1230. For example, the FPGA 1230 may execute a state machine or other operations defined by the user kernel 1306. In block 1410, the computing device 1200 determines whether the user kernel 1306 has requested to read data from a memory device external to the FPGA 1230. The user kernel 1306 may, for example, request input data for processing. The external memory device may be embodied as, for example, the memory 1224 and/or another DRAM device coupled to the FGPA 1230. If the user kernel 1306 has not requested to read data, the method 1400 branches to block 1420, described below. If the user kernel 1306 has requested to read data, the method 1400 advances to block 1412.

In block 1412, the micro-encryption engine 1312 of the FPGA 1230 reads encrypted data from the external memory device. As described above, the external memory device may be embodied as the memory 1224, an external DRAM device, or other memory device external to the FPGA 1230. The encrypted data may be stored at an address in memory provided by or otherwise associated with the user kernel 1306. As described below, in some embodiments the micro-encryption engine 1312 may also retrieve the index of the user kernel 1306 from the external memory device.

In block 1414, the micro-encryption engine 1312 of the FPGA 1230 receives the symmetric encryption key 1310 for the index of the user kernel 1306 from the secure key store 1308. The symmetric encryption key 1310 may be communicated with the micro-encryption engine 1312 using hardware resources of the FPGA 1230 (e.g., a configurable data interchange) that are not accessible to the user kernels 1306. Thus, the symmetric encryption key 1310 remains protected from the user kernels 1306.

In block 1416, the micro-encryption engine 1312 of the FGPA 1230 decrypts the encrypted data using the symmetric encryption key 1310 to generate plain text data. The micro-encryption engine 1312 may use any appropriate cryptographic algorithm to decrypt the encrypted data. In block 1418, the micro-encryption engine 1312 forwards the plain text data to the user kernel 1306 at the specified index. The user kernel 1306 may process or otherwise access the plain text data. The plain text data remains protected from and not accessible by any other user kernels 1306. After forwarding the plain text data to the user kernel 1306, the method 1400 branches to block 1420.

In block 1420, the computing device 1200 determines whether the user kernel 1306 has requested to write data to the external memory device. The user kernel 1306 may, for example, generate output data from processing that should be stored to the memory 1224. If the user kernel 1306 has not requested to write data, the method 1400 loops back to block 1408 to continue executing the user kernel 1306. If the user kernel 1306 has requested to write data, the method 1400 advances to block 1422.

In block 1422, the micro-encryption engine 1312 of the FGPA 1230 receives plain text data from the user kernel 1306 at the specified index. The plain text data may, for example, be generated as output data by the user kernel 1306. In block 1424, the micro-encryption engine 1312 of the FPGA 1230 receives the symmetric encryption key 1310 for the index of the user kernel 1306 from the secure key store 1308. As described above, the symmetric encryption key 1310 may be communicated with the micro-encryption engine 1312 using hardware resources of the FPGA 1230 (e.g., a configurable data interchange) that are not accessible to the user kernels 1306. Thus, the symmetric encryption key 1310 remains protected from the user kernels 1306.

In block 1426, the micro-encryption engine 1312 of the FGPA 1230 encrypts the plain text data using the symmetric encryption key 1310 to generate encrypted data. As described above, the micro-encryption engine 1312 may use any appropriate cryptographic algorithm to encrypt the plain text data.

In block 1428, the micro-encryption engine 1312 writes the encrypted data to the external memory device. As described above, the external memory device may be embodied as the memory 1224, an external DRAM device, or other memory device external to the FPGA 1230. The encrypted data may be stored at an address in memory provided by or otherwise associated with the user kernel 1306. As described above, the encrypted data may be later retrieved and decrypted by the user kernel 1306. In some embodiments, in block 1430, the micro-encryption engine 1312 may write the index of the user kernel 1306 with the encrypted data. For example, the index may be written as a header or other metadata associated with the encrypted data in the external memory device. After writing the encrypted data, the method 1400 loops back to block 1408 to continue executing the user kernel 1306.

EXAMPLES

Illustrative examples of the technologies disclosed herein are provided below. An embodiment of the technologies may include any one or more, and any combination of, the examples described below.

Example 1 includes a computing device for data security, the computing device comprising: an external memory device; and a field-programmable gate array (FPGA) coupled to the external memory device, wherein the FPGA is to: execute a first user kernel of the FPGA, wherein the first user kernel is identified by a first index; store a first symmetric encryption key associated with the first index, wherein the first symmetric encryption key is not accessible by user kernels of the FPGA; read encrypted input data from the external memory device coupled to the FPGA; decrypt the encrypted input data with the first symmetric encryption key to generate plain input text data in response to a reading of the encrypted input data; forward the plain text input data to the first user kernel in response to decryption of the encrypted input data; receive plain text output data from the first user kernel; encrypt the plain text output data with the first symmetric encryption key to generate encrypted output data in response to receipt of the plain text output data; and write the encrypted output data to the external memory device in response to encryption of the plain text output data.

Example 2 includes the subject matter of Example 1, and wherein the FGPA is further to write the first index in the external memory device in response to the encryption of the plain text output data.

Example 3 includes the subject matter of any of Examples 1 and 2, and further comprising: one or more processors; and one or more memory devices having stored therein a plurality of instructions that, when executed by the one or more processors, cause the computing device to program the FGPA with the first user kernel; wherein to execute the first user kernel comprises to execute the first user kernel in response to programming of the FGPA.

Example 4 includes the subject matter of any of Examples 1-3, and further comprising: one or more processors; and one or more memory devices having stored therein a plurality of instructions that, when executed by the one or more processors, cause the computing device to securely provision the FPGA with the first symmetric encryption key at the first index; wherein to store the first symmetric encryption key comprises to store the first symmetric encryption key in response to provisioning of the FGPA with the first symmetric encryption key.

Example 5 includes the subject matter of any of Examples 1-4, and wherein to securely provision the FGPA with the first symmetric encryption key comprises to perform a network key exchange with the FPGA using an FPGA device key that is unique to the FPGA.

Example 6 includes the subject matter of any of Examples 1-5, and wherein to securely provision the FGPA with the first symmetric encryption key comprises to perform a PCI express data transfer with the FPGA.

Example 7 includes the subject matter of any of Examples 1-6, and wherein the FPGA is further to return the first index in response to the provisioning of the FGPA with the first symmetric encryption key.

Example 8 includes the subject matter of any of Examples 1-7, and wherein: to store the first symmetric encryption key associated with the first index comprises to store the first symmetric encryption key with a secure key store programmed block of the FPGA; and to perform the cryptographic operation comprises to perform the cryptographic operation with a micro encryption engine programmed block of the FPGA.

Example 9 includes the subject matter of any of Examples 1-8, and wherein the FPGA is further to: retrieve the first symmetric encryption key with the first index; wherein to perform the cryptographic operation comprises to perform the cryptographic operation in response to providing of the first symmetric encryption key.

Example 10 includes the subject matter of any of Examples 1-9, and wherein the first user kernel comprises a programmed user block of the FPGA.

Example 11 includes the subject matter of any of Examples 1-10, and wherein to store the first symmetric encryption key comprises to store the first symmetric encryption key in a write-only key store of the FPGA.

Example 12 includes the subject matter of any of Examples 1-11, and wherein the FPGA is further to: execute a second user kernel of the FPGA, wherein the second user kernel is identified by a second index; and store a second symmetric encryption key associated with the second index, wherein the second symmetric encryption key is not accessible by the first user kernel of the FPGA.

Example 13 includes a method for data security, the method comprising: executing, by a computing device, a first user kernel of a field-programmable gate array (FPGA) of the computing device, wherein the first user kernel is identified by a first index; storing, by the FPGA, a first symmetric encryption key associated with the first index, wherein the first symmetric encryption key is not accessible by user kernels executed by the FPGA; reading, by the FPGA, encrypted input data from the external memory device; decrypting, by the FPGA, the encrypted input data with the first symmetric encryption key to generate plain text input data in response to reading the encrypted input data; forwarding, by the FPGA, the plain text input data to the first user kernel in response to decrypting the encrypted input data; receiving, by the FPGA, plain text output data from the first user kernel; encrypting, by the FPGA, the plain text output data with the first symmetric encryption key to generate encrypted output data in response to receiving the plain text output data; and writing, by the FGPA, the encrypted output data to the external memory device in response to encrypting the plain text output data.

Example 14 includes the subject matter of Example 13, and further comprising writing, by the FPGA, the first index in the external memory device in response to encrypting the plain text output data.

Example 15 includes the subject matter of any of Examples 13 and 14, and further comprising: programming, by the computing device, the FGPA with the first user kernel; wherein executing the first user kernel comprises executing the first user kernel in response to programming the FGPA.

Example 16 includes the subject matter of any of Examples 13-15, and further comprising: securely provisioning, by the computing device, the FPGA with the first symmetric encryption key at the first index; wherein storing the first symmetric encryption key comprises storing the first symmetric encryption key in response to securely provisioning the FGPA with the first symmetric encryption key.

Example 17 includes the subject matter of any of Examples 13-16, and wherein securely provisioning the FGPA with the first symmetric encryption key comprises performing a network key exchange with the FPGA using an FPGA device key that is unique to the FPGA.

Example 18 includes the subject matter of any of Examples 13-17, and wherein securely provisioning the FGPA with the first symmetric encryption key comprises performing a PCI express data transfer with the FPGA.

Example 19 includes the subject matter of any of Examples 13-18, and further comprising returning, by the FPGA, the first index in response to provisioning the FGPA with the first symmetric encryption key.

Example 20 includes the subject matter of any of Examples 13-19, and wherein: storing the first symmetric encryption key associated with the first index comprises storing the first symmetric encryption key with a secure key store programmed block of the FPGA; and performing the cryptographic operation comprises performing the cryptographic operation with a micro encryption engine programmed block of the FPGA.

Example 21 includes the subject matter of any of Examples 13-20, and further comprising: retrieving, by the FPGA, the first symmetric encryption key with the first index; wherein performing the cryptographic operation comprises performing the cryptographic operation in response to retrieving the first symmetric encryption key.

Example 22 includes the subject matter of any of Examples 13-21, and wherein the first user kernel comprises a programmed user block of the FPGA.

Example 23 includes the subject matter of any of Examples 13-22, and wherein storing the first symmetric encryption key comprises storing the first symmetric encryption key in a write-only key store of the FPGA.

Example 24 includes the subject matter of any of Examples 13-23, and further comprising: executing, by a computing device, a second user kernel of the FPGA, wherein the second user kernel is identified by a second index; and storing, by the FPGA, a second symmetric encryption key associated with the second index, wherein the second symmetric encryption key is not accessible by the first user kernel of the FPGA.

Example 25 includes a computing device comprising: a processor; and a memory having stored therein a plurality of instructions that when executed by the processor cause the computing device to perform the method of any of Examples 13-24.

Example 26 includes one or more non-transitory, computer readable storage media comprising a plurality of instructions stored thereon that in response to being executed result in a computing device performing the method of any of Examples 13-24.

Example 27 includes a computing device comprising means for performing the method of any of Examples 13-24.

Example 28 includes a computing device for data security, the computing device comprising: an external memory device; and a field-programmable gate array (FPGA) coupled to the external memory device, wherein the FPGA comprises: first user kernel circuitry, wherein the first user kernel circuitry is identified by a first index; secure key store circuitry to store a first symmetric encryption key associated with the first index, wherein the first symmetric encryption key is not accessible by user kernels of the FPGA; and micro encryption engine circuitry to (i) read encrypted input data from the external memory device coupled to the FPGA, (ii) decrypt the encrypted input data with the first symmetric encryption key to generate plain input text data in response to a reading of the encrypted input data, (iii) forward the plain text input data to the first user kernel in response to decryption of the encrypted input data, (iv) receive plain text output data from the first user kernel, (v) encrypt the plain text output data with the first symmetric encryption key to generate encrypted output data in response to receipt of the plain text output data, and (vi) write the encrypted output data to the external memory device in response to encryption of the plain text output data.

Example 29 includes the subject matter of Example 28, and wherein the micro encryption engine circuitry is further to write the first index in the external memory device in response to the encryption of the plain text output data.

Example 30 includes the subject matter of any of Examples 28 and 29, and further comprising: kernel programmer circuitry to program the FGPA with the first user kernel circuitry; wherein the FPGA is to execute the first user kernel circuitry in response to programming of the FGPA.

Example 31 includes the subject matter of any of Examples 28-30, and further comprising: key provisioner circuitry to securely provision the FPGA with the first symmetric encryption key at the first index; wherein to store the first symmetric encryption key comprises to store the first symmetric encryption key in response to provisioning of the FGPA with the first symmetric encryption key.

Example 32 includes the subject matter of any of Examples 28-31, and wherein to securely provision the FGPA with the first symmetric encryption key comprises to perform a network key exchange with the FPGA using an FPGA device key that is unique to the FPGA.

Example 33 includes the subject matter of any of Examples 28-32, and wherein to securely provision the FGPA with the first symmetric encryption key comprises to perform a PCI express data transfer with the FPGA.

Example 34 includes the subject matter of any of Examples 28-33, and wherein the secure key store circuitry is further to return the first index in response to the provisioning of the FGPA with the first symmetric encryption key.

Example 35 includes the subject matter of any of Examples 28-34, and wherein: the secure key store circuitry comprises a programmed block of the FPGA; and the micro encryption engine circuitry comprises a programmed block of the FPGA.

Example 36 includes the subject matter of any of Examples 28-35, and wherein the secure key store circuitry is further to: retrieve the first symmetric encryption key with the first index; and provide the first symmetric encryption key to the micro encryption engine circuitry in response to retrieval of the first symmetric encryption key; wherein to perform the cryptographic operation comprises to perform the cryptographic operation in response to providing of the first symmetric encryption key.

Example 37 includes the subject matter of any of Examples 28-36, and wherein the first user kernel circuitry comprises a programmed user block of the FPGA.

Example 38 includes the subject matter of any of Examples 28-37, and wherein to store the first symmetric encryption key comprises to store the first symmetric encryption key in a write-only key store of the FPGA.

Example 39 includes the subject matter of any of Examples 28-38, and wherein: the FPGA further comprises second user kernel circuitry, wherein the second user kernel circuitry is identified by a second index; and the secure key store circuitry is further to store a second symmetric encryption key associated with the second index, wherein the second symmetric encryption key is not accessible by the first user kernel circuitry of the FPGA.

Example 40 includes a computing device for data security, the computing device comprising: circuitry for executing a first user kernel of a field-programmable gate array (FPGA) of the computing device, wherein the first user kernel is identified by a first index; means for storing, by the FPGA, a first symmetric encryption key associated with the first index, wherein the first symmetric encryption key is not accessible by user kernels executed by the FPGA; means for reading, by the FPGA, encrypted input data from the external memory device; means for decrypting, by the FPGA, the encrypted input data with the first symmetric encryption key to generate plain text input data in response to reading the encrypted input data; means for forwarding, by the FPGA, the plain text input data to the first user kernel in response to decrypting the encrypted input data; means for receiving, by the FPGA, plain text output data from the first user kernel; means for encrypting, by the FPGA, the plain text output data with the first symmetric encryption key to generate encrypted output data in response to receiving the plain text output data; and means for writing, by the FGPA, the encrypted output data to the external memory device in response to encrypting the plain text output data.

Example 41 includes the subject matter of Example 40, and further comprising means for writing, by the FPGA, the first index in the external memory device in response to encrypting the plain text output data.

Example 42 includes the subject matter of any of Examples 40 and 41, and further comprising: means for programming, by the computing device, the FGPA with the first user kernel; wherein the circuitry for executing the first user kernel comprises circuitry for executing the first user kernel in response to programming the FGPA.

Example 43 includes the subject matter of any of Examples 40-42, and further comprising: means for securely provisioning, by the computing device, the FPGA with the first symmetric encryption key at the first index; wherein the means for storing the first symmetric encryption key comprises means for storing the first symmetric encryption key in response to securely provisioning the FGPA with the first symmetric encryption key.

Example 44 includes the subject matter of any of Examples 40-43, and wherein the means for securely provisioning the FGPA with the first symmetric encryption key comprises means for performing a network key exchange with the FPGA using an FPGA device key that is unique to the FPGA.

Example 45 includes the subject matter of any of Examples 40-44, and wherein the means for securely provisioning the FGPA with the first symmetric encryption key comprises means for performing a PCI express data transfer with the FPGA.

Example 46 includes the subject matter of any of Examples 40-45, and further comprising means for returning, by the FPGA, the first index in response to provisioning the FGPA with the first symmetric encryption key.

Example 47 includes the subject matter of any of Examples 40-46, and wherein: the means for storing the first symmetric encryption key associated with the first index comprises means for storing the first symmetric encryption key with a secure key store programmed block of the FPGA; and the means for performing the cryptographic operation comprises means for performing the cryptographic operation with a micro encryption engine programmed block of the FPGA.

Example 48 includes the subject matter of any of Examples 40-47, and further comprising: means for retrieving, by the FPGA, the first symmetric encryption key with the first index; wherein the means for performing the cryptographic operation comprises means for performing the cryptographic operation in response to retrieving the first symmetric encryption key.

Example 49 includes the subject matter of any of Examples 40-48, and wherein the first user kernel comprises a programmed user block of the FPGA.

Example 50 includes the subject matter of any of Examples 40-49, and wherein the means for storing the first symmetric encryption key comprises means for storing the first symmetric encryption key in a write-only key store of the FPGA.

Example 51 includes the subject matter of any of Examples 40-50, and further comprising: circuitry for executing, by a computing device, a second user kernel of the FPGA, wherein the second user kernel is identified by a second index; and means for storing, by the FPGA, a second symmetric encryption key associated with the second index, wherein the second symmetric encryption key is not accessible by the first user kernel of the FPGA.

The invention claimed is:

1. A computing device for data security, the computing device comprising:
   an external memory device; and
   a field-programmable gate array (FPGA) coupled to the external memory device, wherein the FPGA is to:
     execute a first user kernel of the FPGA, wherein the first user kernel is identified by a first index;
     store a first symmetric encryption key associated with the first index, wherein the first symmetric encryption key is not accessible by user kernels of the FPGA;
     read encrypted input data from the external memory device coupled to the FPGA;
     decrypt the encrypted input data with the first symmetric encryption key to generate plain input text data in response to a reading of the encrypted input data;
     forward the plain text input data to the first user kernel in response to decryption of the encrypted input data;
     receive plain text output data from the first user kernel;
     encrypt the plain text output data with the first symmetric encryption key to generate encrypted output data in response to receipt of the plain text output data; and
     write the encrypted output data to the external memory device in response to encryption of the plain text output data.

2. The computing device of claim 1, wherein the FGPA is further to write the first index in the external memory device in response to the encryption of the plain text output data.

3. The computing device of claim 1, further comprising:
   one or more processors; and
   one or more memory devices having stored therein a plurality of instructions that, when executed by the one or more processors, cause the computing device to program the FGPA with the first user kernel;
   wherein to execute the first user kernel comprises to execute the first user kernel in response to programming of the FGPA.

4. The computing device of claim 1, further comprising:
   one or more processors; and
   one or more memory devices having stored therein a plurality of instructions that, when executed by the one or more processors, cause the computing device to securely provision the FPGA with the first symmetric encryption key at the first index;
   wherein to store the first symmetric encryption key comprises to store the first symmetric encryption key in response to provisioning of the FGPA with the first symmetric encryption key.

5. The computing device of claim 4, wherein to securely provision the FGPA with the first symmetric encryption key comprises to perform a network key exchange with the FPGA using an FPGA device key that is unique to the FPGA.

6. The computing device of claim 4, wherein to securely provision the FGPA with the first symmetric encryption key comprises to perform a PCI express data transfer with the FPGA.

7. The computing device of claim 4, wherein the FPGA is further to return the first index in response to the provisioning of the FGPA with the first symmetric encryption key.

8. The computing device of claim 1, wherein:
to store the first symmetric encryption key associated with the first index comprises to store the first symmetric encryption key with a secure key store programmed block of the FPGA; and
to perform the cryptographic operation comprises to perform the cryptographic operation with a micro encryption engine programmed block of the FPGA.

9. The computing device of claim 1, wherein the FPGA is further to:
retrieve the first symmetric encryption key with the first index;
wherein to perform the cryptographic operation comprises to perform the cryptographic operation in response to providing of the first symmetric encryption key.

10. The computing device of claim 1, wherein the first user kernel comprises a programmed user block of the FPGA.

11. The computing device of claim 1, wherein to store the first symmetric encryption key comprises to store the first symmetric encryption key in a write-only key store of the FPGA.

12. The computing device of claim 1, wherein the FPGA is further to:
execute a second user kernel of the FPGA, wherein the second user kernel is identified by a second index; and
store a second symmetric encryption key associated with the second index, wherein the second symmetric encryption key is not accessible by the first user kernel of the FPGA.

13. One or more non-transitory computer-readable storage media comprising a plurality of instructions stored thereon that, in response to being executed, cause a computing device to:
execute a first user kernel of a field-programmable gate array (FPGA) of the computing device, wherein the first user kernel is identified by a first index;
store, by the FPGA, a first symmetric encryption key associated with the first index, wherein the first symmetric encryption key is not accessible by user kernels executed by the FPGA;
read, by the FPGA, encrypted input data from the external memory device;
decrypt, by the FPGA, the encrypted input data with the first symmetric encryption key to generate plain text input data in response to reading the encrypted input data;
forward, by the FPGA, the plain text input data to the first user kernel in response to decrypting the encrypted input data;
receive, by the FPGA, plain text output data from the first user kernel;
encrypt, by the FPGA, the plain text output data with the first symmetric encryption key to generate encrypted output data in response to receiving the plain text output data; and
write, by the FGPA, the encrypted output data to the external memory device in response to encrypting the plain text output data.

14. The one or more non-transitory computer-readable storage media of claim 13, further comprising a plurality of instructions stored thereon that, in response to being executed, cause the computing device to write, by the FPGA, the first index in the external memory device in response to encrypting the plain text output data.

15. The one or more non-transitory computer-readable storage media of claim 13, further comprising a plurality of instructions stored thereon that, in response to being executed, cause the computing device to:
program, by the computing device, the FGPA with the first user kernel;
wherein to execute the first user kernel comprises to execute the first user kernel in response to programming the FGPA.

16. The one or more non-transitory computer-readable storage media of claim 13, further comprising a plurality of instructions stored thereon that, in response to being executed, cause the computing device to:
securely provision the FPGA with the first symmetric encryption key at the first index;
wherein to store the first symmetric encryption key comprises to store the first symmetric encryption key in response to securely provisioning the FGPA with the first symmetric encryption key.

17. The one or more non-transitory computer-readable storage media of claim 16, wherein to securely provision the FGPA with the first symmetric encryption key comprises to perform a network key exchange with the FPGA using an FPGA device key that is unique to the FPGA.

18. The one or more non-transitory computer-readable storage media of claim 16, wherein to securely provision the FGPA with the first symmetric encryption key comprises to perform a PCI express data transfer with the FPGA.

19. The one or more non-transitory computer-readable storage media of claim 16, further comprising a plurality of instructions stored thereon that, in response to being executed, cause the computing device to return, by the FPGA, the first index in response to provisioning the FGPA with the first symmetric encryption key.

20. The one or more non-transitory computer-readable storage media of claim 13, wherein:
to store the first symmetric encryption key associated with the first index comprises to store the first symmetric encryption key with a secure key store programmed block of the FPGA; and
to perform the cryptographic operation comprises to perform the cryptographic operation with a micro encryption engine programmed block of the FPGA.

21. The one or more non-transitory computer-readable storage media of claim 13, further comprising a plurality of instructions stored thereon that, in response to being executed, cause the computing device to:
retrieve, by the FPGA, the first symmetric encryption key with the first index;
wherein to perform the cryptographic operation comprises to perform the cryptographic operation in response to retrieving the first symmetric encryption key.

22. The one or more non-transitory computer-readable storage media of claim 13, wherein the first user kernel comprises a programmed user block of the FPGA.

23. The one or more non-transitory computer-readable storage media of claim 13, wherein to store the first symmetric encryption key comprises to store the first symmetric encryption key in a write-only key store of the FPGA.

24. The one or more non-transitory computer-readable storage media of claim 13, further comprising a plurality of instructions stored thereon that, in response to being executed, cause the computing device to:
execute, by a computing device, a second user kernel of the FPGA, wherein the second user kernel is identified by a second index; and
store, by the FPGA, a second symmetric encryption key associated with the second index, wherein the second symmetric encryption key is not accessible by the first user kernel of the FPGA.

25. A computing device for data security, the computing device comprising:
circuitry for executing a first user kernel of a field-programmable gate array (FPGA) of the computing device, wherein the first user kernel is identified by a first index;
means for storing, by the FPGA, a first symmetric encryption key associated with the first index, wherein the first symmetric encryption key is not accessible by user kernels executed by the FPGA;
means for reading, by the FPGA, encrypted input data from the external memory device;
means for decrypting, by the FPGA, the encrypted input data with the first symmetric encryption key to generate plain text input data in response to reading the encrypted input data;
means for forwarding, by the FPGA, the plain text input data to the first user kernel in response to decrypting the encrypted input data;
means for receiving, by the FPGA, plain text output data from the first user kernel;
means for encrypting, by the FPGA, the plain text output data with the first symmetric encryption key to generate encrypted output data in response to receiving the plain text output data; and
means for writing, by the FGPA, the encrypted output data to the external memory device in response to encrypting the plain text output data.

26. A method for data security, the method comprising:
executing, by a computing device, a first user kernel of a field-programmable gate array (FPGA) of the computing device, wherein the first user kernel is identified by a first index;
storing, by the FPGA, a first symmetric encryption key associated with the first index, wherein the first symmetric encryption key is not accessible by user kernels executed by the FPGA;
reading, by the FPGA, encrypted input data from the external memory device;
decrypting, by the FPGA, the encrypted input data with the first symmetric encryption key to generate plain text input data in response to reading the encrypted input data;
forwarding, by the FPGA, the plain text input data to the first user kernel in response to decrypting the encrypted input data;
receiving, by the FPGA, plain text output data from the first user kernel;
encrypting, by the FPGA, the plain text output data with the first symmetric encryption key to generate encrypted output data in response to receiving the plain text output data; and
writing, by the FGPA, the encrypted output data to the external memory device in response to encrypting the plain text output data.

27. The method of claim 26, further comprising:
programming, by the computing device, the FGPA with the first user kernel;
wherein executing the first user kernel comprises executing the first user kernel in response to programming the FGPA.

28. The method of claim 26, further comprising:
securely provisioning, by the computing device, the FPGA with the first symmetric encryption key at the first index;
wherein storing the first symmetric encryption key comprises storing the first symmetric encryption key in response to securely provisioning the FGPA with the first symmetric encryption key.

* * * * *